United States Patent Office 3,321,370
Patented May 23, 1967

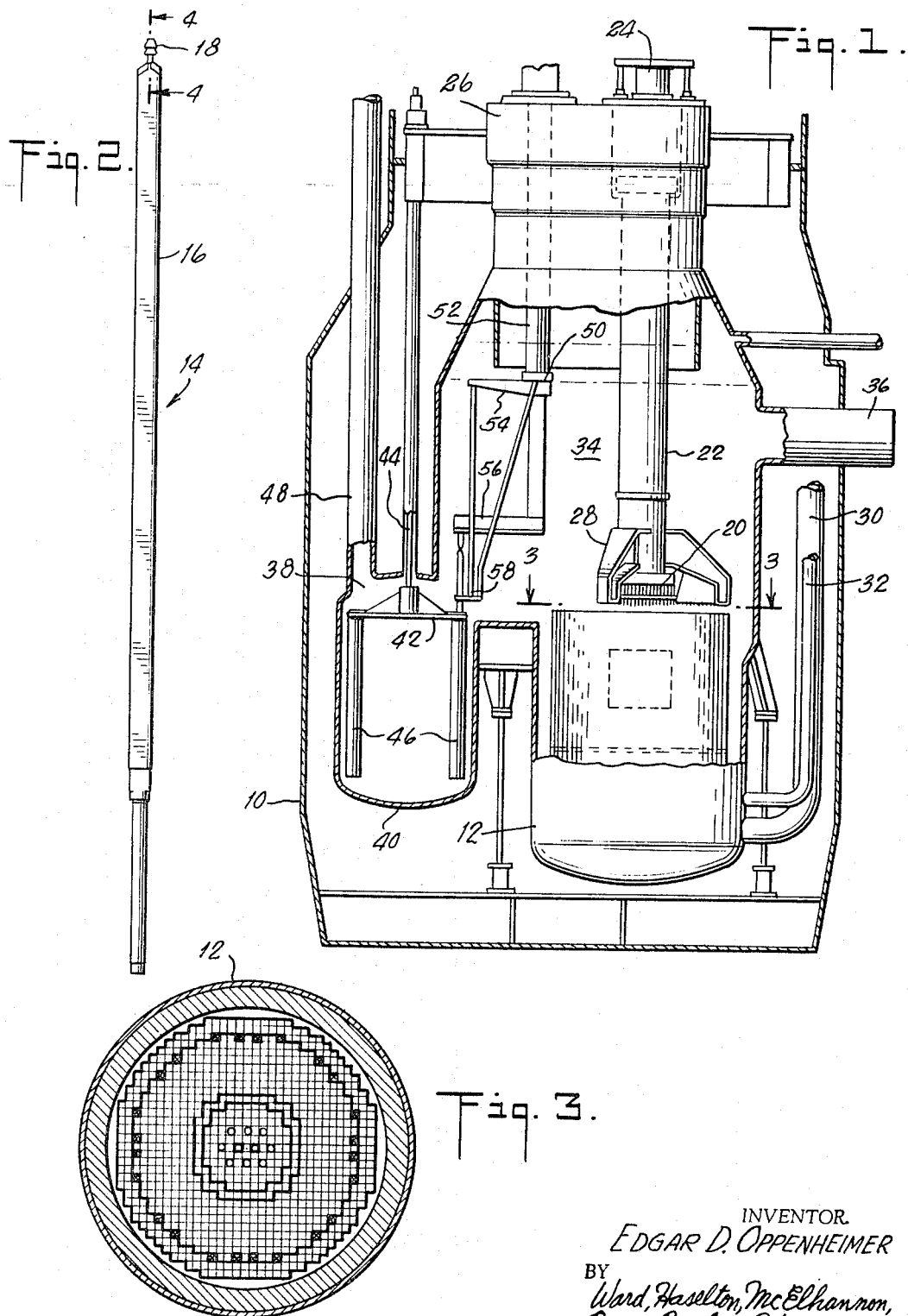

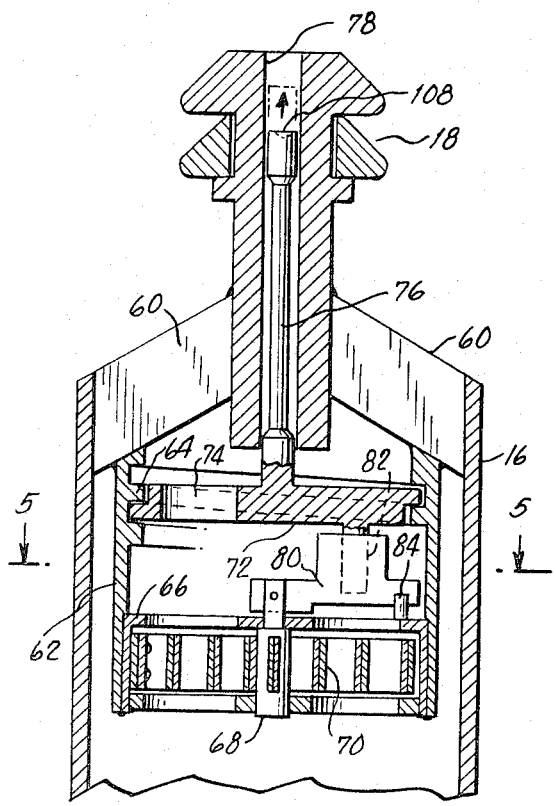
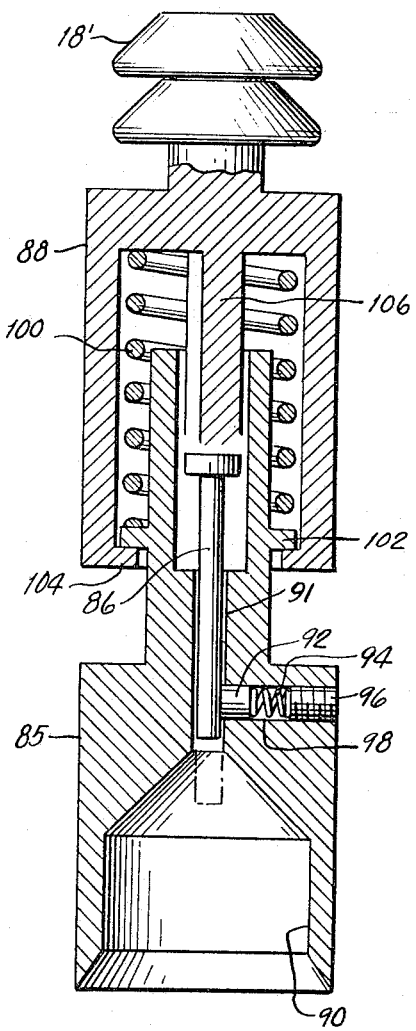
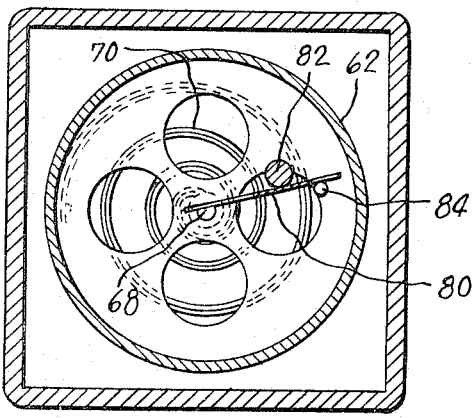

3,321,370
METHOD AND APPARATUS FOR REMOTE TEMPERATURE MEASUREMENT IN A NUCLEAR REACTOR INSTALLATION
Edgar D. Oppenheimer, Mamaroneck, N.Y., assignor to Atomic Power Development Associates, Inc., Detroit, Mich., a corporation of New York
Filed Sept. 3, 1964, Ser. No. 394,281
4 Claims. (Cl. 176—19)

This invention relates to the measurement of temperature and more particularly it concerns a method and means for remotely indicating the temperature of a point separated from an observer by an information distorting medium.

While there presently exist a great variety of devices and techniques for indicating temperatures; and while many of these have been incorporated in remote temperature indicating systems; there still exist certain situations wherein the medium between the observer and the remote point is such that it becomes extremely difficult, if not impossible, to transmit the desired temperature information without undue distortion.

One particularly relevant situation occurs in connection with the operation of certain nuclear power plants. It is important that the temperature distribution at various points in and about the reactor core of such plants be known with a fair degree of precision in order that the plant can be operated safely and efficiently. In some cases the reactor core however, is deeply immersed in a bath of flowing, molten sodium which in turn is permeated with intense radioactivity. The sodium bath moreover, is contained and shielded by means of an extremely heavy, thick walled vessel. Because of the opaqueness of the vessel and the sodium, visual means cannot be used to observe the condition of remotely stationed temperature sensing devices. Also, the high radioactivity of the surrounding medium makes the effective transmission of information by means of electrical or electromagnetic signals extremely undependable.

The present invention provides for the remote indication of locally detected temperatures wherein the temperature sensing and the temperature observing points are separated by an information distorting medium such as molten sodium. One of the features of the invention lies in the fact that the accuracy of the remote indication is not affected by conditions of radioactivity existing between the sensing and observation points. A further feature resides in the fact that temperatures at a plurality of remote points within a nuclear reactor core may be indicated with a minimum of equipment and with a minimum change to existing structures.

The present invention, in one of its aspects, involves the provision of locally positioned temperature sensing means capable of generating a mechanical displacement which represents the temperature at such local position. Also provided are displacement responsive means which are brought into contact with the temperature sensing means until the condition of the displacement responsive means comes to represent the mechanical displacement attained by the temperature sensing means. The displacement responsive means is then withdrawn and its condition is remotely observed.

In another of its aspects the present invention provides a novel locally positionable temperature responsive means as well as novel displacement responsive means.

As specifically embodied, the present invention may be practiced by providing, at the top of each core subassembly in a nuclear reactor, a bimetallic strip formed in a spiral so that the molten sodium which flows by the point at which temperature is to be measured may pass over the spiral surfaces of the bimetallic strip without adverse effect. The outer end of the strip is fixed to the core subassembly while its other end is connected to a shaft which is rotated as the strip winds and unwinds with temperature variations. The shaft is connected to turn a rotatable member of a screw assembly so that the rotatable member moves longitudinally upon rotation and attains a longitudinal position representative of the temperature experienced by the bimetallic strip. There is also provided a displacement sensing device which may be pressed down over the subassembly to determine the degree of longitudinal displacement attained by the rotatable element. This displacement sensing device is provided with two members longitudinally movable relative to each other and their longitudinal displacement is maintained by means of a friction element while the device is moved to a remote position for observation.

There has thus been outlined rather broadly the more important features of the invention in order that the detained description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized in a variety of ways for carrying out the several purposes of the invention. It is important, therefore, that the claims be regarded as including such equivalent ways as do not depart from the spirit and scope of the invention.

A specific embodiment of the invention is shown in the accompanying drawings and is described in the following portions of the specification. In the drawings:

FIG. 1 is a side elevational view in section, of a nuclear reactor in which temperature indicating is provided according to the present invention;

FIG. 2 is an enlarged elevational view of a typical fuel subassembly within the reactor of FIG. 1;

FIG. 3 is an enlarged section view taken along lines 3—3 of FIG. 1;

FIG. 4 is an enlarged section view taken along line 4—4 of FIG. 2;

FIG. 5 is a cross section view taken along lines 5—5 of FIG. 4; and

FIG. 6 is an elevational view in section of a displacement sensing device useful in the practice of the present invention.

In order to explain the features of the invention in a manner such that their full significance may be appreciated, certain of the principal aspects of a typical sodium cooled type nuclear reactor utilizing the invention will first be outline. It will be understood, however, that the invention is similarly adaptable for use in certain other types of reactors and in certain other situations.

The reactor shown in FIG. 1 is enclosed within a primary shield tank 10. Near the bottom and to one side of the primary shield tank there is positioned a lower reactor vessel 12 which contains a plurality of elongated subassemblies 14 within which nuclear reactions take place for the generation of useful heat and for the refinement of raw fuel. A typical subassembly, as shown in FIG. 2, is seen to comprise an elongated rectangular casing 16 having a handling head 18 formed at its upper tip. Within each subassembly there are located a plurality of spaced pins of different materials. These pins, depending upon the particular subassembly may comprise raw fuel, active fuel, blanket materials or control and safety materials. The view in FIG. 3 illustrates how the various subassemblies containing these different materials are arranged. While the particular arrangement of subassemblies forms no part of the present invention, it may be stated in general that those subassemblies containing active fuel, and control materials are located nearer the center of the reactor vessel while those subassemblies containing blanket and safety materials are located closer to the periphery of the vessel.

During regular operation of the reactor the control subassemblies are moved longitudinally to adjust the rate of nuclear reaction and the amount of power output. This is accomplished by means of control rod actuator members 20 which move up and down within a vertical hold down column 22. These actuators are connected to the handling heads of the various control subassemblies. The movements of the actuator members 20, and consequently of the subassemblies to which they are connected, are controlled by means of an actuating mechanism 24 mounted at the top of the hold down column 22. This hold down column is supported within a rotating plug assembly 26 which in turn is mounted to rotate above the reactor vessel and about an axis offset from the central axis of the vessel. The hold down column is also provided with hold down heads 28 which during regular operation exert a downward force on certain of the subassemblies to retain them in position. While the nuclear reactions are taking place, the heat thus generated is transferred to molten sodium which is pumped into the reactor through high and low pressure input pipes 30 and 32 and up through the subassemblies forming the core and blanket of the reactor. The molten sodium which has passed through the subassemblies is contained by means of an upper reactor vessel 34, and passes out through a sodium outlet pipe 36 located a short distance below the operating level of the liquid sodium in the upper reactor vessel.

For transferring the various subassemblies into and out of the reactor vessel there is provided a transfer rotor 38 which rotates within a transfer rotor container 40, located next to the lower reactor vessel 12. The transfer rotor 38 includes a spider 42 suspended at the end of a vertical shaft 44 which rises out from the top of the reactor and is turned by external means (not shown). A plurality of subassembly carrier pots 46 are suspended at the ends of the arms of the spider 42 and move about the inside of the transfer rotor container 40 as the transfer rotor 38 is turned. Above one of the circumferential positions of the subassembly carrier pots 46 there rises an exit tube 48 through which subassemblies, carried in the carrier pots 46 are transferred to and from the transfer rotor 38.

The subassemblies 14 are transferred between the lower reactor vessel 12 and the subassembly carrier pots 46 of the transfer rotor 38 by means of an offset handling mechanism 50. This mechanism includes an offset handling column 52 which rotates within and moves up and down with respect to the rotating plug assembly 26. A pair of transverse arms 54 and 56 extend horizontally from points near the bottom of the offset handling column 52 and serve to support and control the opening and closing of a gripper device 58 which attaches to the handling heads 18 of the subassemblies 14.

When changing subassemblies, the reactor is shut down and the hold down column 22 is raised to expose the handling heads 18 of each of the subassemblies in the lower reactor vessel 12. Also, at this time the transfer rotor 38 is filled through the exit tube 48 with subassembly carrier pots 46 each loaded with a fresh subassembly. The offset handling mechanism 50 is then operated to withdraw the fresh subassemblies from the transfer rotor 38 and to position them in the lower reactor vessel; and to return spent subassemblies from the lower reactor vessel 12 to empty carrier pots 46 in the transfer rotor where they remain to decay while the reactor is again placed into operation. These decaying subassemblies are later removed from the reactor when it is shut down again to place new subassemblies into the lower reactor vessel.

It will be seen from the drawings that the transfer rotor container 40 is submerged in the same molten sodium bath which passes through the subassemblies in the lower reactor vessel 12. Thus all of the aforedescribed transfer operations take place under the surface molten sodium bath.

While not all of the subassemblies are removed from the reactor during shut down, it is important to know at this time the maximum temperature which each subassembly acquired while it was in operation. FIGS. 4 and 5 show a subassembly construction according to the present invention and adapted for providing this desired information.

As shown in FIG. 4 each handling head 18 is mounted above its subassembly by means of spacer bars 60 which are welded to and extend between points on the handling head 18 and the rectangular casing 16 of the subassembly. The handling head is of generally cylindrical configuration and is shaped at its tip for convenient engagement and disengagement by the gripper device 58 of the offset handling mechanism 50. The spacer bars 60 and handling head 18 are arranged to permit uninterrupted upward flow of molten sodium from within the subassembly to the sodium bath in the upper reactor vessel 34.

A tubular body member 62 is welded to the underside of each of the spacer bars 60 and extends downwardly therefrom within and in coaxial alignment with the subassembly casing 16. The upper interior of the tubular body member is provided with internal threads 64 of the acme type. The lower interior of the body member 62 supports therein a short hollow cylindrical casing 66. The casing has openings about its upper and lower surfaces for permitting liquid sodium flow up into and through the tubular body member 62. The center portion of the casing 66 supports a vertical shaft 68 for rotation along the longitudinal axis of the subassembly.

A temperature sensitive elongated bimetallic strip 70 is formed into spiralled configuration and mounted within the casing 66 with its outer end attached to the casing and its inner end attached to the vertical shaft 68. This arrangement is best seen in the section view of FIG. 5. It will be appreciated that during operation of the reactor, molten sodium flowing up through the subassembly 16 passes uninterruptedly through the cylindrical casing 66 and over the entire surface of the elongated bimetallic strip 70. As the strip tends to straighten or curl with variations in the temperature of the flowing sodium, it causes the vertical shaft 68 to rotate accordingly.

Immediately above the hollow casing 66 but within the tubular body member 62, there is provided a spider like rotatable element 72 which is peripherally threaded to engage the internal threads 64 within the body member. The rotatable element itself is provided with a number of openings 74 so as not to interfere with sodium flow. Rising up from the center of the rotatable element 72 is an indicator rod 76 which fits within a longitudinal opening 78 in the handling head 18. It will be seen that as the rotatable element 72 turns within the tubular body member 62, its indicator rod 76 will rise and fall within the handling head 18 and attain a longitudinal position relative to the top of the head corresponding to the degree of rotation undertaken by the rotatable element.

Means are provided for unidirectional communication of the rotational movement of the vertical shaft 68 to the rotatable element 72; so that as the spiralled bimetallic element tends to unwind with increases in temperature, the resulting counterclockwise movement (as viewed in FIG. 5) of the vertical shaft will cause similar rotation of the rotatable element and the indicator rod 76 will attain a longitudinal position proportional to temperature. This unidirectional motion communication means includes a radial arm 80 attached to the vertical shaft 68 and extending horizontally over the bimetallic strip 70. This arm contacts a depending member 82 attached to a point near the periphery of the rotatable element 72. As the vertical shaft turns counterclockwise (as viewed in FIG. 5) the radial arm 80 contacts the depending member 82 of the rotatable element 72 causing the element to turn.

Reverse rotation of the radial arm 80, caused by decreasing temperatures, is not communicated to the rotatable element and the normal friction associated with its threads maintains it in its maximum counterclockwise position so that the indicator rod 76 will remain at its uppermost position representing the maximum temperature attained. An important feature of this arrangement is that it permits application of mechanical feeler means, such as are described hereinafter, to detect and represent the displacement attained by the rod without in any way changing its displacement. Thus a stable and positive representation of maximum temperature is provided.

An arm stop member 84 is mounted on the top of the hollow casing 66 and is positioned to engage the radial arm 80 and prevent its clockwise rotation past a certain point should the temperature drop severely. This stop member prevents the arm from engaging the depending member 82 in a clockwise direction and turning the rotatable element away from its maximum temperature indicating position.

FIG. 6 illustrates the construction of a position or displacement sensing device for obtaining a representation of the degree of longitudinal elevation of the indicator rod 76 within the handling head 18 of the subassembly 14. This displacement sensing device is made up of a head positionable member 85, a rod positionable member 86 and an actuator member 88. The head positionable member 85 is formed at its bottom with a socket-like cavity 90 which fits over and locates on the handling head 18 of the subassembly. The rod positionable member 86 is itself an elongated rod and is movable longitudinally within a bore 91 which rises above the socket-like cavity 90 within the head positionable member. The rod positionable member is of small enough diameter to fit down into the longitudinal opening 78 within the handling head 18 and to abut on the top of the indicator rod 76. A friction element 92 is forced against the side of the rod positionable member by means of a spring 94, and a setscrew 96, threadedly engaged in a transverse hole 98 within the head positionable member 85. This serves to permit longitudinal movement of the rod positionable member under positively applied forces but prevents inadvertent shifting of the members relative to each other between movements.

The actuator member 88 is of tubular configuration and fits over the upper end of the head positionable member 85 for telescopic movement therewith. The upper portion of the actuator member is itself formed with a handling head 18' for movement within the reactor by means of the gripper device 58 of the offset handling mechanism 50. A compression spring 100 extends between an outer flange 102 on the head positionable member 85 to the upper end of the interior of the actuator member 88 and serves to maintain these two members in their most mutually extended position. The members are limited in this movement by means of an inwardly extending lip 104 about the bottom of the actuator member 88. This lip engages the bottom of the outer flange 102 on the head positionable member. The actuator member is further provided with an axial plunger 106 which extends downwardly from the upper end of its interior. This plunger engages and pushes down upon the top of the rod positionable member 86 as the actuator member is pressed downwardly over the head positionable member.

After the reactor is shut down, the displacement sensing device is used by holding its handling head 18' as by the gripper device 58 of the offset handling mechanism 50; and pressing the device down over the handling head 18 of the subassembly whose maximum temperature is to be ascertained. The displacement sensing device is lowered until its head positionable member rests upon the handling head 18 of the subassembly. Further downward movement compresses the spring 100 so that the plunger 106 presses down on the rod positionable member 86 causing it to move downwardly until it engages the top of the indicator rod 76 in the subassembly. The displacement sensing device is then removed whereupon its spring 100 causes the actuator member 88 to move upward relative to the head positionable member 85. The rod positionable member 86, however, remains in place relative to the head positionable member 85 under influence of the friction element 96, pressing transversely against it. After the displacement sensing device has been used once on a fuel subassembly, it may be transferred to one of the carrier pots 46 in the transfer rotor 38; and, if desired, removed therefrom through the exit tube 48. It may then be removed to any desired remote position for observation. By repeating this sequence the single displacement sensing device may be used in conjunction with the fuel handling mechanism to indicate the maximum coolant temperatures attained at any number of selected locations about the upper core region of the reactor.

It will be appreciated that this entire operation can be carried out under a bath of molten sodium and that no distortion whatever is produced in the transferral of the temperature representation from the vicinity of the nuclear reactions to points completely removed from the reactors. Also because of the screwthread arrangement within the subassembly for converting rotational to longitudinal movement, an irreversible effect is achieved whereby the displacement sensing device may be pressed down against the top of the handling head and the indicator rod therein without changing their relative longitudinal positions. For resetting the device the top of the indicator rod 76 may be slotted as at 108 so that it may be turned down by means of a screwdriver type tool carried by the offset handling mechanism.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. In a nuclear reactor, apparatus for obtaining a remote indication of the temperature at selected points in the vicinity of the reactor core, said apparatus comprising a housing located at each of said selected points, temperature responsive mechanical elements mounted to produce displacements on each housing in response to temperature variations, a displacement sensitive device, said displacement sensitive device including two relatively movable portions arranged to be relatively positioned to conform to the displacement occurring at each housing upon being pressed thereagainst and means associated with said displacement sensitive device for maintaining said two relatively movable portions in fixed positional relationship upon movement of said device to a point external to said reactor.

2. A method for externally indicating the maximum temperature attained at selected locations in the vicinity of the core of a sodium cooled nuclear reactor during operation thereof, said method comprising the steps of providing, during operation of said reactor, mechanical displacements representative of the highest temperatures attained at each of said selected locations, halting operation of said reactor and then in turn bringing in to each of said selected locations, displacement sensitive means which conform to and maintain a condition representative of the mechanical displacement at a selected location and withdrawing and observing the condition of said displacement sensitive means at a point external to said reactor.

3. In a nuclear reactor having a core comprising a plurality of removable subassemblies maintained in a bath of flowing molten sodium and a subassembly handling mechanism constructed to grip the head of a selected subassembly for withdrawing such subassembly from the core and transferring it to a point remote from the reactor, the combination comprising temperature responsive mechanical elements mounted near the handling head of each subassembly and constructed to produce mechanical displacements in response to temperature variations at their respective subassemblies, a displacement sensitive device constructed to be handled by said subassembly handling mechanism, said displacement sensitive device including two relatively movable portions arranged to be relatively positioned according to the mechanical displacement occurring at each subassembly upon being pressed thereagainst by said subassembly handling mechanism and means associated with said displacement sensitive device for maintaining said two relatively movable portions in fixed positional relationship upon movement of said device to a point external to said reactor.

4. In a nuclear reactor having a core comprising a plurality of removable subassemblies maintained in a bath of flowing molten sodium and a subassembly handling mechanism constructed to grip the head of a selected subassembly for withdrawing such subassembly from the core and transferring it to a point remote from the reactor, the method for externally indicating the maximum temperature attained at selected subassemblies during operation of said nuclear reactor, said method comprising the steps of providing, during operation of said reactor, mechanical displacements representative of the highest temperatures attained at each of said selected subassemblies, halting operation of said reactor, and then in turn bringing in to each of said selected subassemblies via said subassembly transfer mechanism, displacement sensitive means in a manner causing said displacement sensitive means to conform to and maintain a condition representative of the mechanical displacement at such selected subassembly, withdrawing said displacement sensitive means by means of said subassembly transfer mechanism and observing the condition of said displacement sensitive means at a point external to said reactor.

References Cited by the Examiner
UNITED STATES PATENTS

| | | | |
|---|---|---|---|
| 2,400,371 | 5/1946 | Reeser | 33—169 |
| 2,426,955 | 9/1947 | Stroup | 33—169 |
| 2,743,613 | 5/1956 | Kebbon | 73—363.9 |
| 3,021,274 | 2/1962 | Fifield et al. | 176—19 |
| 3,087,886 | 4/1963 | Robinson | 176—19 |
| 3,088,320 | 5/1963 | Saxby | 73—363.5 |
| 3,122,018 | 2/1964 | Freeman et al. | 73—363.9 |
| 3,160,567 | 12/1964 | Steinberg et al. | 176—19 |
| 3,163,043 | 12/1964 | Snider | 73—363.5 |

FOREIGN PATENTS 348,482  10/1960  Switzerland.

CARL D. QUARFORTH, *Primary Examiner.*

L. DEWAYNE RUTLEDGE, *Examiner.*

H. E. BEHREND, *Assistant Examiner.*